US012792679B2

(12) United States Patent
Zhang et al.

(10) Patent No.: US 12,792,679 B2
(45) Date of Patent: Nov. 10, 2026

(54) SEARCH RESULT DISPLAY METHOD AND APPARATUS, COMPUTER DEVICE, AND STORAGE MEDIUM

(71) Applicant: Beijing Zitiao Network Technology Co., Ltd., Beijing (CN)

(72) Inventors: Enhua Zhang, Beijing (CN); Xuan Zhao, Beijing (CN); Jingjing Tu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 76 days.

(21) Appl. No.: 18/566,024

(22) PCT Filed: Oct. 14, 2022

(86) PCT No.: PCT/CN2022/125339
§ 371 (c)(1),
(2) Date: Nov. 30, 2023

(87) PCT Pub. No.: WO2023/109292
PCT Pub. Date: Jun. 22, 2023

(65) Prior Publication Data
US 2024/0220563 A1 Jul. 4, 2024

(30) Foreign Application Priority Data
Dec. 14, 2021 (CN) ......................... 202111526405.5

(51) Int. Cl.
*G06F 16/9538* (2019.01)
*G06F 3/04847* (2022.01)
*G06F 16/9535* (2019.01)

(52) U.S. Cl.
CPC ...... *G06F 16/9538* (2019.01); *G06F 3/04847* (2013.01); *G06F 16/9535* (2019.01)

(58) Field of Classification Search
CPC ............. G06F 16/9538; G06F 3/04847; G06F 16/9535; G06F 16/00; G06F 16/951
(Continued)

(56) References Cited

U.S. PATENT DOCUMENTS 7,181,438 B1 * 2/2007 Szabo ................ G06Q 30/0269 705/14.27
9,015,195 B1 4/2015 Sanghai
(Continued)

FOREIGN PATENT DOCUMENTS

CN 103810198 A 5/2014
CN 106503258 A 3/2017
(Continued)

OTHER PUBLICATIONS

China National Intellectual Property Administration, Office action issued in Chinese Application No. 202111526405.5, Apr. 29, 2023, 8 pages.
(Continued)

*Primary Examiner* — Tony Mahmoudi
(74) *Attorney, Agent, or Firm* — Alleman Hall LLP

(57) ABSTRACT

A search result display method and apparatus, a computer device, and a storage medium. The method comprises: in response to a search request of a user, determining a search intention type corresponding to the search request, wherein the search intention type is used for indicating a demand degree of the user for a result of a commodity class; determining a commodity card display form according to the determined search intention type; and displaying, in a search result page, a search result comprising a commodity card according to the commodity card display form, wherein the commodity card is used for carrying information content of a corresponding commodity.

18 Claims, 8 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 2003/0093421 | A1* | 5/2003 | Kimbrough | G06Q 30/06 |
| 2017/0140006 | A1* | 5/2017 | Yang | G06F 16/2228 |
| 2020/0394210 | A1* | 12/2020 | Shazeer | G06F 16/338 |
| 2024/0045898 | A1* | 2/2024 | Zhu | G06Q 30/0631 |

FOREIGN PATENT DOCUMENTS

| | | | |
|---|---|---|---|
| CN | 111159552 | A | 5/2020 |
| CN | 111444405 | A | 7/2020 |
| CN | 112990999 | A | 6/2021 |
| CN | 113486252 | A | 10/2021 |
| CN | 114168866 | A | 3/2022 |

OTHER PUBLICATIONS

ISA China National Intellectual Property Administration, International Search Report Issued in Application No. PCT/CN2022/125339, Dec. 27, 2022, 10 pages.

* cited by examiner

SEARCH RESULT DISPLAY METHOD AND APPARATUS, COMPUTER DEVICE, AND STORAGE MEDIUM

CROSS-REFERENCE TO RELATED APPLICATION(S)

This application is a U.S. National Stage Application of PCT Application Serial No. PCT/CN2022/125339, filed Oct. 14, 2022, which claims priority to Chinese Application No. 202111526405.5, filed in the China Patent Office on Dec. 14, 2021, and entitled "Search Result Display Method and Apparatus, Computer Device, and Storage Medium", the disclosures of which are incorporated herein by reference in their entities.

FIELD

The present disclosure relates to the technical field of the Internet, and in particular, to a search result display method and apparatus, a computer device, and a storage medium.

BACKGROUND

A user may input a keyword into a search page for information search. A plurality of pieces of media information may be found according to the keyword input by the user, and the plurality of pieces of media information are sorted according to the relevance with the keyword, and are displayed in a search result page.

When the user desires to search a result of a commodity class, if the search is still performed according to the traditional way of keyword search and sort for display, the user cannot find commodity information meeting their demand quickly.

SUMMARY

Embodiments of the present disclosure at least provide a search result display method and apparatus, a computer device, and a storage medium.

In a first aspect, an embodiment of the present disclosure provides a method of displaying a search result, comprising:

in response to a search request of a user, determining a search intention type corresponding to the search request, wherein the search intention type is used for indicating a demand degree of the user for a result of a commodity class;

determining a commodity card display form according to the determined search intention type; and displaying, in a search result page, a search result comprising a commodity card according to the commodity card display form, wherein the commodity card is used for carrying information content of a corresponding commodity.

In an optional embodiment, the determined search intention type is a commodity class search intention; the demand degree of the commodity class search intention for the result of the commodity class is higher than a demand degree of a search intention of another class for the result of the commodity class; and the commodity card display form corresponding to the commodity class search intention comprises:

displaying respective commodity cards in a first display region of the search result page according to a preset arrangement mode, wherein the commodity cards comprise at least one of a first commodity card carrying video content as information content, a second commodity card carrying live streaming content as information content, and a third commodity card carrying image content as information content.

In an optional embodiment, displaying respective commodity cards in the first display region of the search result page according to the preset arrangement mode comprises:

displaying a plurality of initial commodity cards in the first display region of the search result page according to a transverse arrangement mode; and in response to a left-right sliding operation acting on the displayed commodity cards, switching to display different commodity cards in the first display region.

In an optional embodiment, displaying respective commodity cards in the first display region of the search result page according to the preset arrangement mode comprises:

displaying a plurality of initial commodity cards in the first display region of the search result page according to a multi-column arrangement mode;

in response to a sliding operation acting on the displayed commodity cards or in response to a trigger operation for prompt information of viewing more commodities, expanding a display position range of the first display region; and displaying the plurality of initial commodity cards and another commodity card in the first display region with the expanded display position range.

In an optional embodiment, the determined search intention type is an intermediate class search intention, the demand degree of the intermediate class search intention for the result of the commodity class is lower than the demand degree of the commodity class search intention for the result of the commodity class, and is higher than the demand degree of a non-commodity class search intention for the result of the commodity class; and the commodity card display form corresponding to the intermediate class search intention comprises:

displaying respective commodity cards in a secondary display region of the search result page according to a superposition display mode, wherein the commodity cards are superposed in the superposition display mode, and each commodity card other than a commodity card located on the topmost layer displays a portion of card information.

In an optional embodiment, displaying, in the search result page, the search result comprising the commodity card according to the commodity card display form, comprises:

displaying the commodity cards in the secondary display region of the search result page according to the superposition display mode; and in response to a trigger operation acting on the commodity cards that are displayed in the superposition mode, sequentially placing a lower-layer commodity card on the topmost layer for display.

In an optional embodiment, the determined search intention type is a non-commodity class search intention; and the demand degree of the non-commodity class search intention for the result of the commodity class is lower than a demand degree of a search intention of another class for the result of the commodity class; and the commodity card display form corresponding to the non-commodity class search intention comprises:

inserting a commodity card matching search information in the search request into a non-commodity search result in the search result page for display.

In an optional embodiment, determining the search intention type corresponding to the search request comprises:

calculating relevance between a search word in the search request and each keyword in a vocabulary library corresponding to the commodity class search intention; and determining the search intention type corresponding to the search request according to the determined relevance.

In an optional embodiment, determining the search intention type corresponding to the search request comprises:

determining multimedia content matching the search request according to the search request;

calculating relevance between the multimedia content and each keyword in a vocabulary library corresponding to the commodity class search intention; and determining the search intention type corresponding to the search request according to the determined relevance.

In a second aspect, an embodiment of the present disclosure provides an apparatus for displaying a search result, comprising:

a first determining module, configured to: in response to a search request of a user, determine a search intention type corresponding to the search request, wherein the search intention type is used for indicating a demand degree of the user for a result of a commodity class;

a second determining module, configured to determine a commodity card display form according to the determined search intention type; and a result display module, configured to: display, in a search result page, a search result comprising a commodity card according to the commodity card display form, wherein the commodity card is used for carrying information content of a corresponding commodity.

In an optional embodiment, the determined search intention type is a commodity class search intention; the demand degree of the commodity class search intention for the result of the commodity class is higher than a demand degree of a search intention of another class for the result of the commodity class; and the result display module is specifically configured to: for the commodity card display form corresponding to the commodity class search intention, display respective commodity cards in a first display region of the search result page according to a preset arrangement mode, wherein the commodity cards comprise at least one of a first commodity card carrying video content as information content, a second commodity card carrying live streaming content as information content, and a third commodity card carrying image content as information content.

In an optional embodiment, the result display module is specifically configured to display a plurality of initial commodity cards in the first display region of the search result page according to a transverse arrangement mode; and in response to a left-right sliding operation acting on the displayed commodity cards, switch to display different commodity cards in the first display region.

In an optional embodiment, the result display module is specifically configured to display a plurality of initial commodity cards in the first display region of the search result page according to a multi-column arrangement mode;

in response to a sliding operation acting on the displayed commodity cards or in response to a trigger operation for prompt information of viewing more commodities, expand a display position range of the first display region; and display the plurality of initial commodity cards and another commodity card in the first display region with the expanded display position range.

In an optional embodiment, the determined search intention type is an intermediate class search intention, the demand degree of the intermediate class search intention for the result of the commodity class is lower than the demand degree of the commodity class search intention for the result of the commodity class, and is higher than the demand degree of a non-commodity class search intention for the result of the commodity class; and the result display module is specifically configured to: for the commodity card display form corresponding to the intermediate class search intention, display the commodity cards in a secondary display region of the search result page in a superposition display mode, wherein the commodity cards are superposed in the superposition display mode, and each commodity card other than a commodity card located on the topmost layer displays a portion of card information.

In an optional embodiment, the result display module is specifically configured to display the commodity cards in the secondary display region of the search result page according to the superposition display mode; and in response to a trigger operation acting on the commodity cards that are displayed in the superposition mode, sequentially place a lower-layer commodity card on the topmost layer for display.

In an optional embodiment, the determined search intention type is the non-commodity class search intention; and the demand degree of the non-commodity class search intention for the result of the commodity class is lower than a demand degree of a search intention of another class s for the result of the commodity class; and the result display module is specifically configured to: for the commodity card display form corresponding to the non-commodity class search intention, insert a commodity card matching search information in the search request into a non-commodity search result in the search result page for display.

In an optional embodiment, the first determining module is specifically configured to calculate relevance between a search word in the search request and each keyword in a vocabulary library corresponding to the commodity class search intention; and determine the search intention type corresponding to the search request according to the determined relevance.

In an optional embodiment, the first determining module is specifically configured to: determine multimedia content matching the search request according to the search request;

calculate relevance between the multimedia content and each keyword in a vocabulary library corresponding to the commodity class search intention; and determine the search intention type corresponding to the search request according to the determined relevance.

In a third aspect, an embodiment of the present disclosure further provides a computer device, comprising: a processor, a memory and a bus, wherein the memory stores a machine-readable instruction executable by the processor, and when the computer device is running, the processor communicates with the memory via the bus, and when executed by the processor, the machine-readable instruction executes steps of the method of displaying a search result in the first aspect or any possible designs in the first aspect.

In a fourth aspect, an embodiment of the present disclosure further provides a computer-readable storage medium, wherein a computer program is stored on the computer-readable storage medium, when executed by a processor, the computer program executes steps of the method of displaying a search result in the first aspect or any possible designs in the first aspect.

In a fifth aspect, an embodiment of the present disclosure further provides a computer program product, comprising a computer program, wherein when executed by a processor, the computer program executes steps of the method of displaying a search result in the first aspect or any possible designs in the first aspect.

In a sixth aspect, an embodiment of the present disclosure further provides a computer program, wherein when executed by a processor, the computer program executes steps of the method of displaying a search result in the first aspect or any possible designs in the first aspect.

With regard to description of effects of the apparatus for displaying a search result, the computer device and the computer-readable storage medium, reference may be made to the description of the method of displaying a search result and thus details are not described herein again.

According to the method of displaying a search result provided in the embodiments of the present disclosure, in response to the search request of the user, the search intention type corresponding to the search request is determined, and wherein the search intention type is used for indicating the demand degree of the user for the result of the commodity class. Then, the commodity card display form is determined according to the determined search intention type; and the search result comprising commodity cards is displayed in the search result page according to the commodity card display form, wherein the commodity card is used for carrying information content of a corresponding commodity. In the embodiments of the present disclosure, the commodity card can be displayed in a target manner according to the search intention type of the user. For example, for a search request with a relatively high demand for a result of a commodity class, a matched commodity card can be displayed in a highlighted mode; and for a search request with a relatively low demand for the result of the commodity class, the commodity card can be displayed in a non-highlighted mode. Therefore commodity information in the search result can be displayed in a mode to meet user requirements, and then the user can browse the information conveniently and effectively.

In order to make the above objectives, features and advantages of the present disclosure more comprehensible, preferred embodiments are described in detail below in combination with the drawings.

BRIEF DESCRIPTION OF THE DRAWINGS

To illustrate technical solutions in the embodiments of the present disclosure more clearly, a brief introduction on the drawings which are needed in the description of the embodiments is given below. The drawings herein are incorporated in and constitute a part of the present specification, and these drawings illustrate embodiments conforming to the present disclosure, and together with the specification, serve to explain the technical solutions of the present disclosure. It should be understood that the following drawings illustrate only some embodiments of the present disclosure, and therefore should not be considered as a limitation to the scope. Those ordinary skilled in the art may also obtain other related drawings according to these drawings without any inventive effort.

DETAILED DESCRIPTION OF EMBODIMENTS

Figure 1:
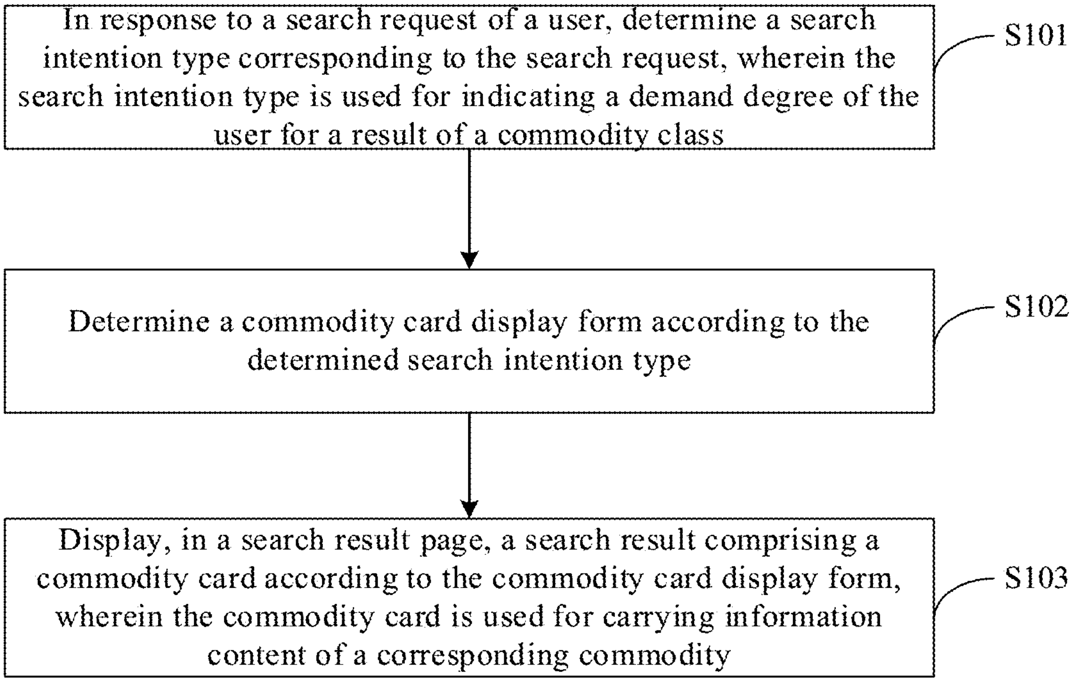
FIG. 1 illustrates a flowchart of a method of displaying a search result provided in embodiments of the present disclosure.

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. Components of the embodiments of the present disclosure generally described and illustrated herein may be arranged and designed in a variety of different configurations. Therefore, the following detailed description of the embodiments of the present disclosure is not intended to limit the scope of the present disclosure as claimed, but merely represents a selected embodiment of the present disclosure. All of other embodiments, obtained by those ordinary skilled in the art based on the embodiments in the present disclosure without any creative effort, fall into the protection scope of the present disclosure.

Studies find that, when a user inputs a keyword via a search page for a comprehensive search, a complex result of the search may be a result aggregating a plurality of pieces of multimedia information. For example, various types of information such as webpages, images, audios, multimedia, news and shopping information are aggregated, and the information is sorted according to the relevance between various types of information and the keyword. For a user's demand for a commodity class search, the traditional way of keyword search is embodied in the comprehensive search mode. The displayed search result is relatively miscellaneous, and the sort and display mode is relatively invariant. As such, the user cannot find the commodity information meeting their demand quickly.

Considering that the traditional way of keyword search is embodied in the comprehensive search mode, its displayed search result is relatively miscellaneous, and the sort and display mode is relatively invariant, the present disclosure provides a method of displaying a search result. The method comprises: determining a search intention type matching a search request of the user, and displaying a commodity card for a user in a target manner based on a demand degree of the user for a result of a commodity class, which is indicated by the search intention type. That is, commodity information in the search result may be displayed in a way such that the user requirement can be met.

It should be noted that similar reference signs and letters represent similar items in the following figures. Therefore, once a certain item is defined in one figure, there is no need to further define and interpret it in the subsequent figures.

In order to facilitate the understanding of the present embodiment, firstly, a method disclosed in the embodiments of the present disclosure is described in detail. An execution body of the method of displaying a search result provided in the embodiments of the present disclosure is generally a computer device having a certain computing capability. In some possible embodiments, the search result display method may be implemented by invoking, by means of a processor, a computer-readable instruction stored in a memory.

The method of displaying a search result in the embodiments of the present disclosure is described in detail below.

As shown in FIG. 1, it is a flowchart of a method of displaying a search result provided in embodiments of the present disclosure. The search result display method in the embodiment of the present disclosure is applied in a scenario of a comprehensive search, and mainly comprises the following steps S101 to S103:

S101: in response to a search request of a user, determining a search intention type corresponding to the search request, wherein the search intention type is used for indicating a demand degree of the user for a result of a commodity class.

In the present step, the search request may be a request initiated, in an information website or an application (APP) page that provides various information, by the user based on his/her own search intention, and is used for attempting to acquire an information search result. For example, a search word, a query statement, or query voice or the like may be input into a query entry of a search terminal. The search terminal may comprise, but is not limited to, a webpage terminal of a target website, an application client, and the like.

In an embodiment, a plurality of search intention types may be preset. For example, a search intention type corresponding to a brand name, a commodity name, commodity function demand description information, and the like may be set to be a commodity class search intention. As another example, a name of a person or a program performing live streaming of products frequently and the like may be set to be an intermediate class search intention. As another example, the search intention type of content irrelevant to a commodity may be set to be a non-commodity class search intention.

Based on this, the search intention type may be divided into: a commodity class search intention, an intermediate class search intention, and a non-commodity class search intention. A demand degree of the commodity class search intention for a result of a commodity class is higher than a demand degree of a search intention of another class for the result of the commodity class. A demand degree of the intermediate class search intention for a result of a commodity class is lower than a demand degree of the commodity class search intention for the result of the commodity class, and is higher than a demand degree of the non-commodity class search intention for the result of the commodity class. A demand degree of the non-commodity class search intention for a result of a commodity class is lower than a demand degree of a search intention of another class for the result of the commodity class (the search intention of another type comprises the commodity class search intention and the intermediate class search intention).

When the search intention type corresponding to the search request is determined, the search intention type may be determined directly based on search information in the search request, and may also be determined based on multimedia content in a comprehensive search result corresponding to the search request, which will be specifically described as follows:

Manner 1: in some embodiments, the search intention type corresponding to the search request may be determined in the following manner: calculating relevance between a search word in the search request and each keyword in a vocabulary library corresponding to the commodity class search intention; and determining the search intention type corresponding to the search request according to the determined relevance.

Here, the vocabulary library corresponding to the commodity class search intention may be a preset vocabulary library, and the vocabulary library comprises a plurality of keywords, wherein the keywords may be determined based on historical search words, historical search results and the like of the user, which is not specifically limited in the embodiment of the present disclosure. Here, the keywords in the vocabulary library corresponding to each search intention type may be determined in advance.

In the present embodiment, lexical semantic may be characterized based on a word feature vector (hereinafter referred to as a word vector), and the word vector is used to calculate the relevance between the search word in the search request and each keyword in the vocabulary library corresponding to the commodity class search intention. In a specific implementation, in a case where the search word is determined, a first word vector corresponding to the search word and a second word vector corresponding to each keyword in the vocabulary library matching the commodity class search intention are determined. Then the similarity between the first word vector and the second word vector may be calculated according to the first word vector corresponding to the search word and each second word vector, and the similarity is used as the relevance for determining the search intention type corresponding to the search request. Here, the higher the relevance is, the higher the similarity between the keyword in the vocabulary library and the search word is. The search intention type corresponding to the most similar keyword may be used as the search intention type corresponding to the search request.

Manner 2: in some other embodiments, according to the search request, multimedia content matching the search request may also be determined; relevance between the multimedia content and each keyword in the vocabulary library corresponding to the commodity class search intention is calculated; and the search intention type corresponding to the search request is determined according to the determined relevance.

In the present embodiment, similarly, a semantic vector corresponding to the multimedia content or the word vector of the keyword therein may be determined, and the similarity between the word vectors corresponding to the keywords in the vocabulary library corresponding to the commodity class search intention may be calculated. For details, reference may be made to the several following implementations:

1) In the case where the multimedia content is determined, the multimedia content is converted into a semantic vector, and each keyword in the vocabulary library corresponding to the commodity class search intention is converted into a second word vector. Then, the similarity between the semantic vector of the multimedia content and the second word vector may be calculated according to the semantic vector corresponding to the multimedia content, and the second word vector corresponding to each keyword in the vocabulary library corresponding to the commodity class search intention. As such, the search intention type corresponding to the search request is determined. Here, the higher the similarity is, the higher the similarity between the keyword corresponding to this similarity and the multimedia content is. The search intention type corresponding to the most similar keyword may be used as the search intention type corresponding to the search request.

2) In addition, in the case where the multimedia content is determined, the keyword may also be selected from a statement indicated by the multimedia content, and the selected keyword is converted into a third word vector. Then the relevance between the third word vector and the second word vector may be calculated, and the search intention type corresponding to the search request is determined by using the relevance.

S102: determining a commodity card display form according to the determined search intention type.

In the present step, the commodity card display form may be preset and comprise, but not limited to, the following display forms: transverse arrangement, multi-column arrangement, superposition display, insertion display and the like. Exemplarily, the transverse arrangement may be a display form where a plurality of commodity cards are transversely arranged in a row, that is, being arranged in a transversely extending mode. The multi-column arrangement may be a display form where a plurality of commodity cards are arranged in a plurality of rows and columns, and are arranged in a longitudinally extending mode. The superposition display may be a display form where a plurality of commodity cards are displayed after being superposed in sequence. The insertion display may be a display form where a commodity card is inserted between different multimedia information for display.

Specifically, the commodity card display form matching the search intention type may be preset, and in the case where the search intention type is determined, the commodity card display form matching it may be found according to the determined search intention type.

Exemplarily, in the case where the search intention type is the commodity class search intention, the commodity card display form may comprise, but is not limited to, the transverse arrangement or multi-column arrangement; in the case where the search intention type is the intermediate class search intention, the commodity card display form may comprise, but is not limited to, the superposition display; and in the case where the search intention type is the non-commodity class search intention, the commodity card display form may comprise, but is not limited to, the insertion display, which will be respectively described in detail below:

1) When it is determined that the search intention type is the commodity class search intention, the commodity card display form corresponding to the commodity class search intention may comprise: displaying respective commodity cards in a first display region of the search result page according to a preset arrangement mode.

The commodity cards may comprise at least one of a first commodity card carrying video content as information content, a second commodity card carrying live streaming content as information content, or a third commodity card carrying image content as information content.

As described above, the first display region may be a display region located at the top of a region for displaying the search result in the search result page. A size of a preset region range may be set according to the actual application scenario, which is not specifically limited in the embodiment of the present disclosure. The preset arrangement mode may comprise, but is not limited to, a transverse arrangement mode (transversely extending), a multi-column arrangement mode (vertically extending), a single-column arrangement mode (vertically extending), and the like.

With regard to displaying the commodity cards in the first display region of the search result page according to the preset arrangement mode, in some embodiments, when it is determined that the preset arrangement mode is the transverse arrangement mode, a plurality of initial commodity cards may be displayed in the first display region of the search result page in the transverse arrangement mode. In response to a left-right sliding operation acting on the displayed commodity cards, different commodity cards are switched for displaying in the first display region.

Figure 2A:
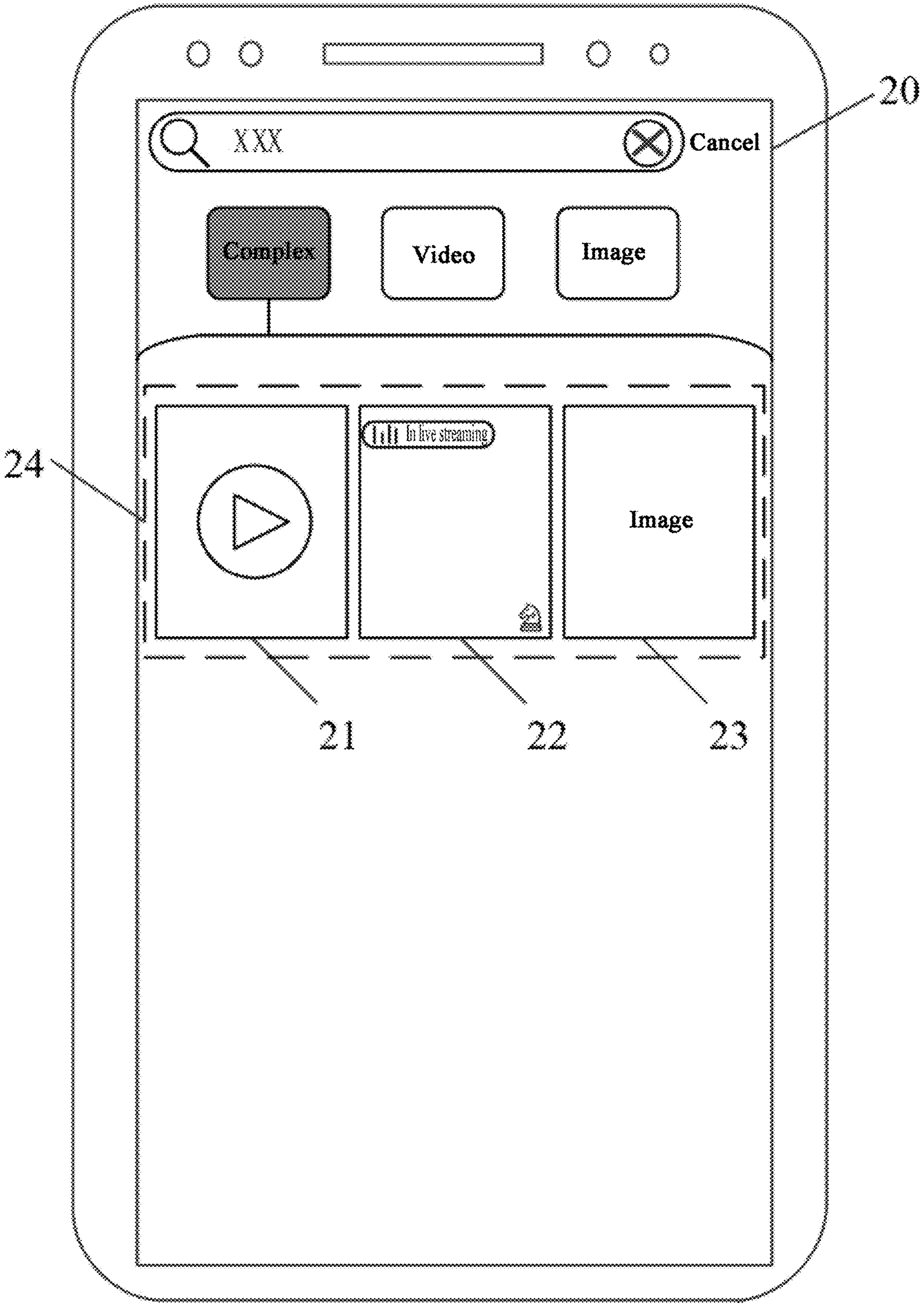
FIG. 2*a* illustrates a schematic diagram of a commodity card display form corresponding to a commodity class search intention in a case where a preset arrangement mode is a transverse arrangement mode provided in embodiments of the present disclosure.

Specifically, the plurality of initial commodity cards may be displayed in the first display region of the search result page in the transverse arrangement mode. Referring to FIG. 2*a*, it is a schematic diagram of the commodity card display form corresponding to the commodity class search intention in the case where the preset arrangement mode is the transverse arrangement mode. 20 represents a search result page, 21 represents a first commodity card, 22 represents a second commodity card, 23 represents a third commodity card, and 24 represents a first display region.

Exemplarily, in FIG. 2*a*, the first commodity card 21, the second commodity card 22 and the third commodity card 23 are displayed in the first display region 24 according to the transverse arrangement mode, and belong to the plurality of initial commodity cards. In addition, the plurality of transversely arranged commodity cards further comprise another commodity card other than the plurality of initial commodity cards, wherein the other commodity card is shielded from the first display region, and/or, is partially shielded from the first display region. Specifically, in response to a left sliding operation or a right sliding operation acting on any commodity card in the first display region, the other commodity cards, which are at least partially shielded from the first display region, may be displayed sequentially in the transverse arrangement.

With regard to the operation acting on the displayed commodity card, in addition to the left-right sliding operation, the operation may further comprise a voice instruction operation, and the like. Specifically, by means of recognizing voice semantics, in a case where the recognition result indicates sliding leftwards or sliding rightwards, the other commodity cards, which are shielded from the first display region, are displayed in the transverse arrangement sequentially.

With regard to displaying respective commodity cards in the first display region of the search result page according to the preset arrangement mode, in some embodiments, when it is determined that the preset arrangement mode is the multi-column arrangement mode, a plurality of initial commodity cards may be displayed in the first display region of the search result page in the multi-column arrangement mode. In response to a sliding operation acting on the displayed commodity cards or in response to a trigger operation for prompt information of viewing more commodities, a display position range of the first display region is expanded. The plurality of initial commodity cards and another commodity card may be displayed in the first display region with the expanded display position range.

Specifically, the plurality of initial commodity cards may be displayed in the first display region of the search result page in the multi-column arrangement mode. In addition to the plurality of initial commodity cards, other commodity cards, which are partially shielded by other display regions, may also be displayed in the first display region of the search result page. In response to the sliding operation acting on the displayed commodity cards or in response to the trigger operation for prompt information of viewing more commodities, a preset expansion range region corresponding to the first display region to be expanded is acquired, afterwards, in one case, the display position range of the first display region may be expanded according to the expansion range region, and the plurality of initial commodity cards and other commodity cards are displayed in the expansion range region; or, in another case, based on the first display region to be expanded, the expansion range region is expanded, and the plurality of initial commodity cards and other commodity cards are displayed in the first display region (comprising both the original first display region and the expansion range region) with the expanded display position range.

Figure 2B:
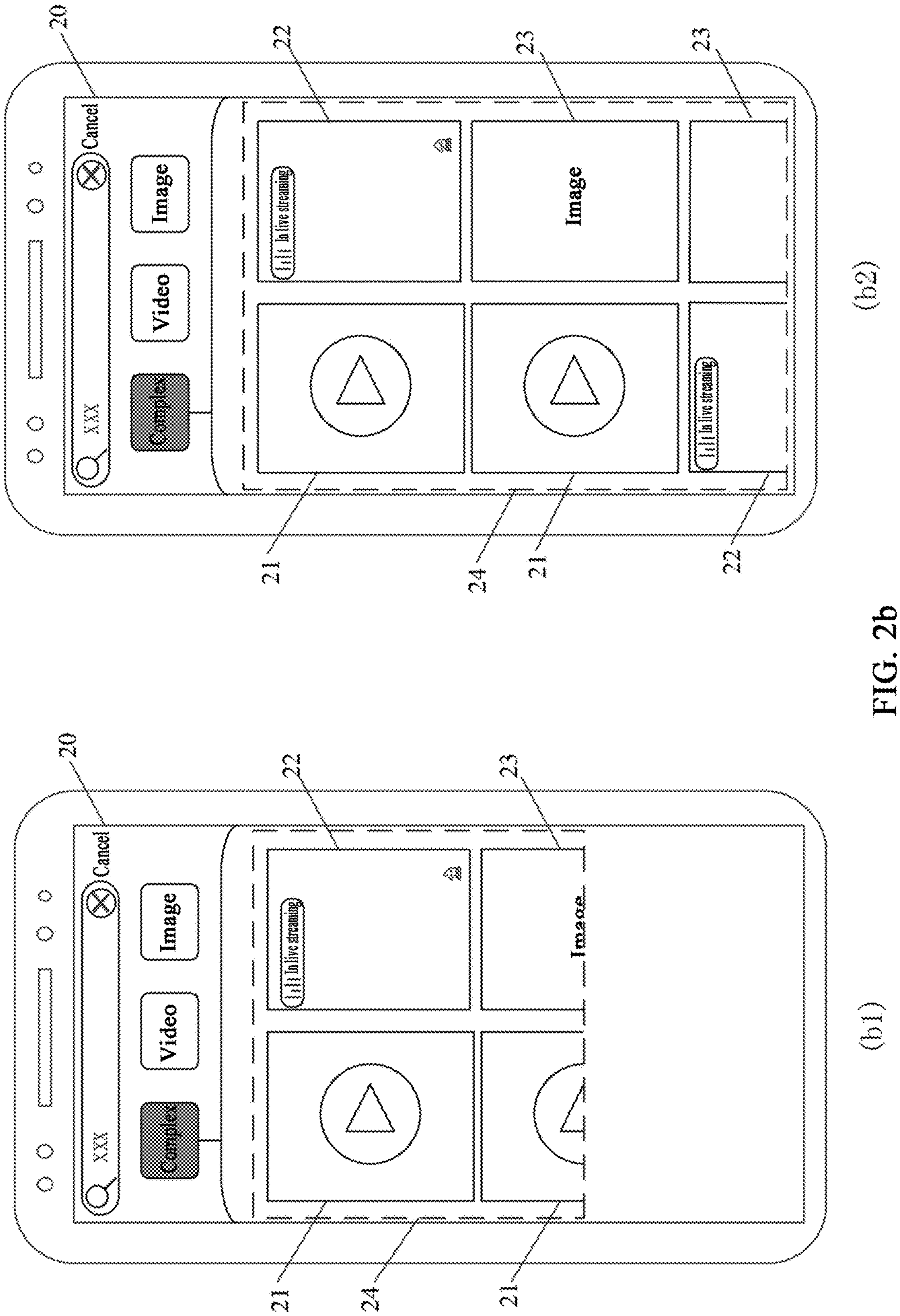
FIG. 2*b* illustrates a schematic diagram of a commodity card display form corresponding to a commodity class search intention in a case where a preset arrangement mode is a multi-column arrangement mode provided in embodiments of the present disclosure.

Referring to FIG. 2*b*, it is a schematic diagram of the commodity card display form corresponding to the commodity class search intention in the case where the preset arrangement mode is the multi-column arrangement mode. 20 represents a search result page, 21 represents a first commodity card, 22 represents a second commodity card, 23 represents a third commodity card, and 24 represents a first display region.

Exemplarily, the first commodity card 21 and the second commodity card 22 are displayed in the first display region 24 in the multi-column arrangement mode, and belong to the plurality of initial commodity cards. In addition, the plurality of commodity cards arranged in the multi-column mode further comprise another commodity card other than the plurality of initial commodity cards, wherein the other commodity card is shielded from the first display region, and/or, is partially shielded from the first display region (e.g., the first commodity card 21 and the third commodity card 23 in FIG. 2*b* each with a portion being displayed and a portion being shielded).

In some embodiments, in response to a sliding operation acting on any commodity card in the first display region, for example, an up-down sliding operation, a display position range of the first display region is expanded at first, and the plurality of initial commodity cards and another commodity card are displayed in the first display region with the expanded display position range. Then, as the sliding operation continues to be executed, the other commodity cards, which are shielded from the first display region with the expanded display position range in the multi-column mode, are displayed sequentially in the first display region with the expanded display position range. Here, referring to (b1) in FIG. 2*b*, which illustrates a schematic diagram of a page before the sliding operation is responded, and (b2) in FIG. 2*b* illustrates a schematic diagram of a page after the sliding operation is responded.

Figure 2C:
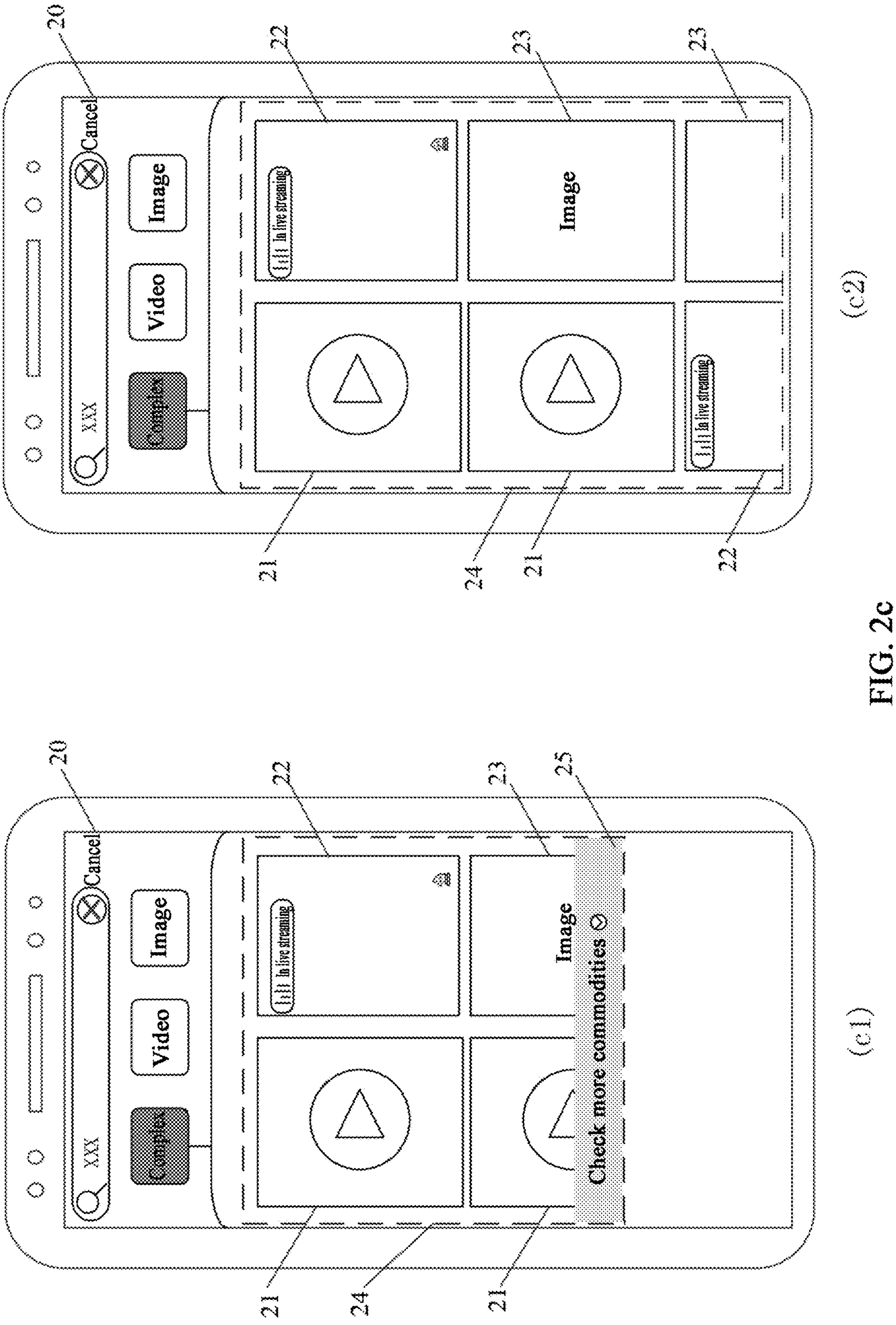
FIG. 2*c* illustrates a schematic diagram of another commodity card display form corresponding to a commodity class search intention in the case where the preset arrangement mode is the multi-column arrangement mode provided in embodiments of the present disclosure.

Alternatively, in some embodiments, in response to a trigger operation for prompt information of viewing more commodities, for example, a click trigger operation and the like, the display position range of the first display region is expanded, and the plurality of initial commodity cards and another commodity card are displayed in the first display region with the expanded display position range. Then, in response to a sliding operation acting on any commodity card in the first display region with the expanded display position range, for example, an up-down sliding operation, the other commodity cards, which are shielded from the first display region with the expanded display position range in the multi-column mode, are displayed sequentially in the first display region with the expanded display position range. Here, referring to FIG. 2*c*, it is a schematic diagram of another commodity card display form corresponding to a commodity class search intention in the case where the preset arrangement mode is the multi-column arrangement mod, wherein (c1) in FIG. 2*c* illustrates a schematic diagram of a page before the sliding operation is responded, and (c2) in FIG. 2*c* illustrates a schematic diagram of a page after the sliding operation is responded. 25 represents the prompt information of viewing more commodities.

2) When it is determined that the determined search intention type is the intermediate class search intention, the commodity card display form corresponding to the intermediate class search intention may comprise: displaying respective commodity cards in a secondary display region of the search result page according to the superposition display mode, wherein the commodity cards are superposed in the superposition display mode, and each commodity card other than the commodity card located at the topmost layer displays a portion of card information.

As described above, the secondary display region may be a lower-side preset region, which is located in the search result page and is adjacent to a preset region at the top. The size of the preset region range may be set according to the actual application scenario, which is not specifically limited in the embodiment of the present disclosure. The superposition display mode may be a display mode in which a plurality of commodity cards are superposed together, and during the superposition process, each commodity card other than the commodity card located on the topmost layer displays a portion of card information.

Figure 3:
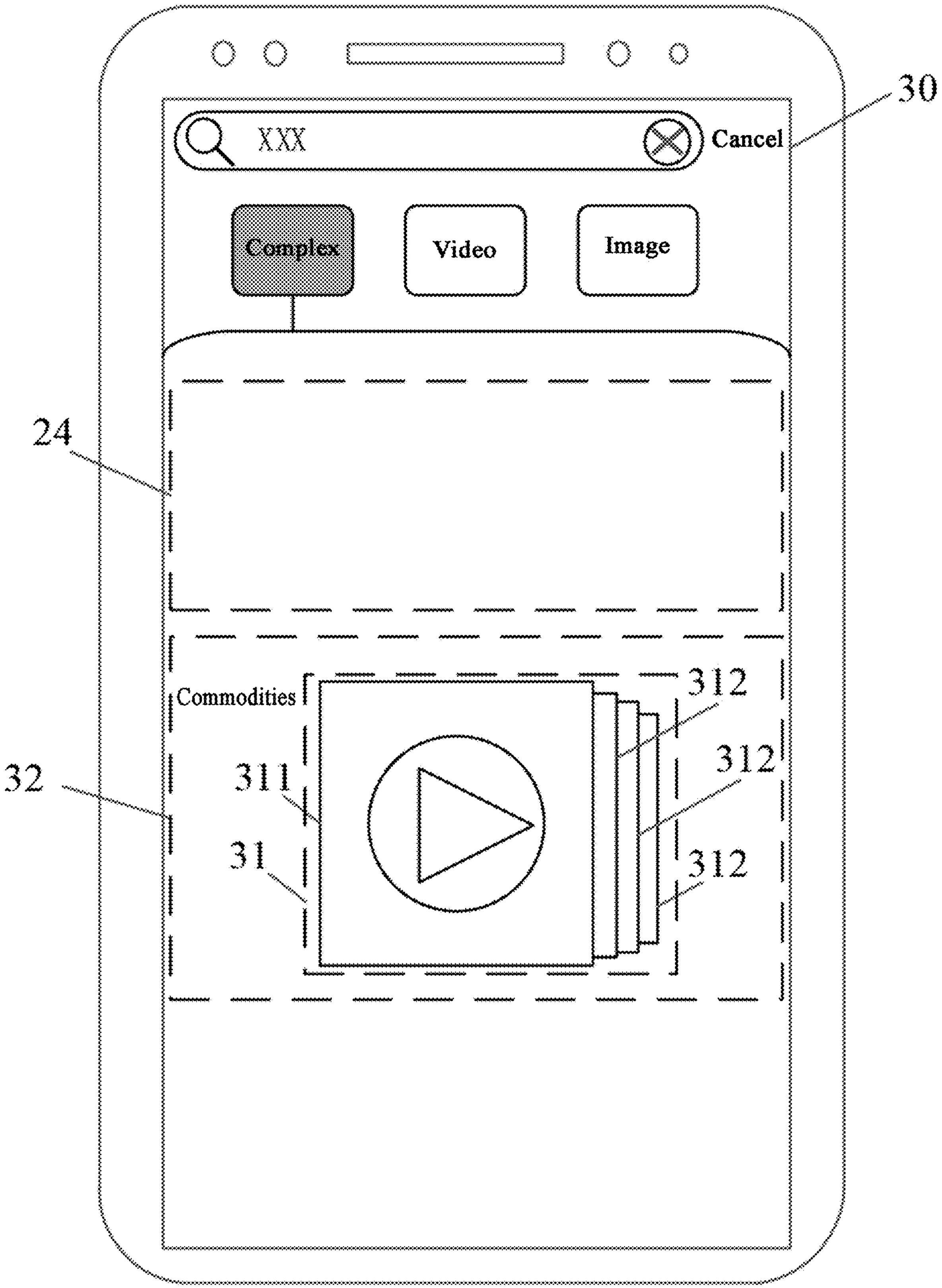
FIG. 3 illustrates a schematic diagram of displaying commodity cards in a secondary display region of a search result page according to a superposition display mode provided in embodiments of the present disclosure.

Referring to FIG. 3, it is a schematic diagram of displaying the commodity cards in the secondary display region of the search result page according to the superposition display mode. 30 represents a search result page, 31 represents a plurality of commodity cards superimposed together, 311 represents a commodity card on the topmost layer, 312 represents a commodity card other than the commodity card on the topmost layer among the plurality of commodity cards superimposed together, and 32 represents a secondary display region.

3) When it is determined that the search intention type is the non-commodity class search intention, the commodity card matching the search information in the search request is inserted into the non-commodity search result in the search result page for display.

Figure 4A:
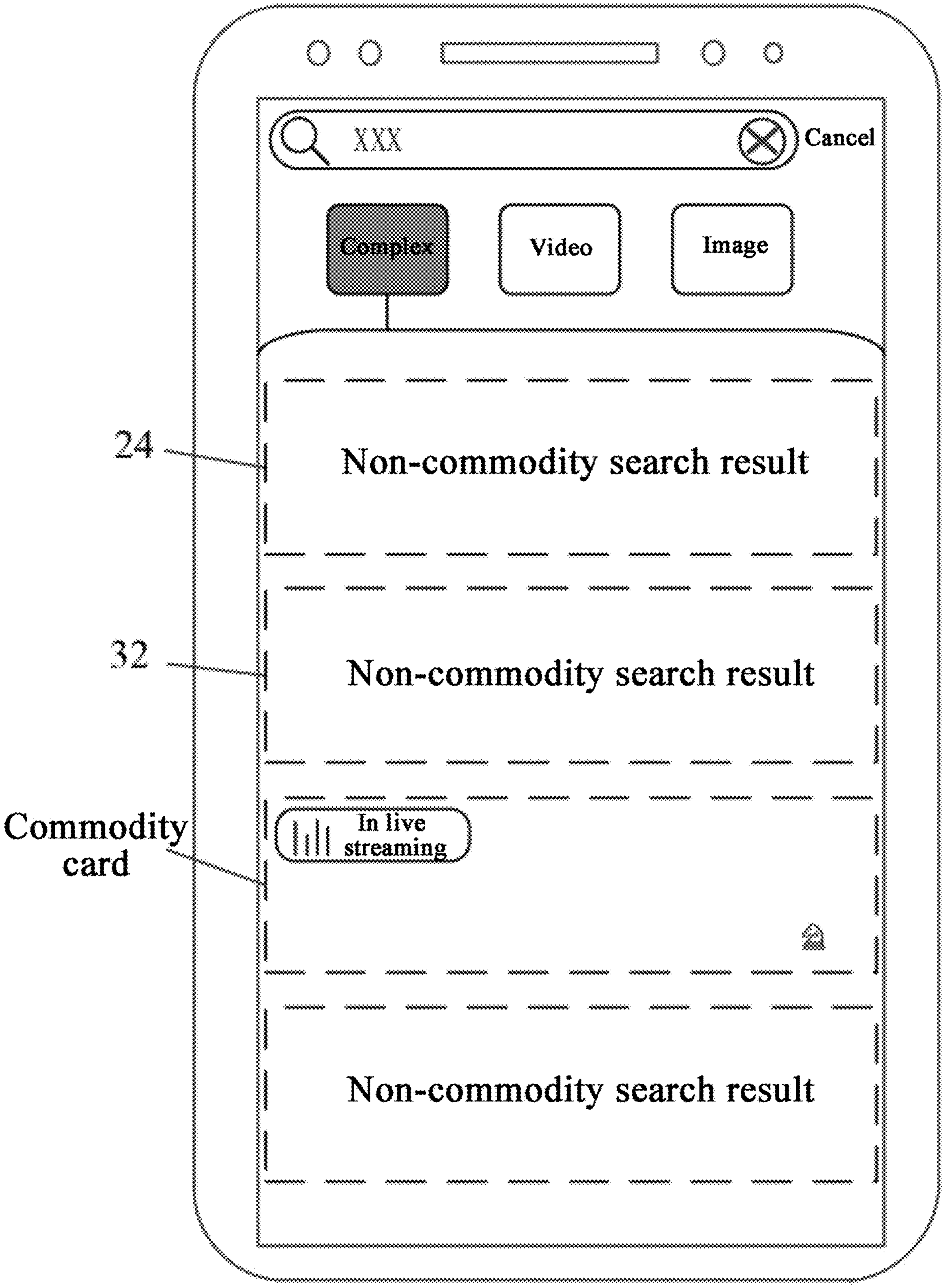
FIG. 4*a* illustrates a schematic diagram of inserting a commodity card matching search information in a search request between a plurality of different non-commodity search results in a search result page provided in embodiments of the present disclosure.
Figure 4B:
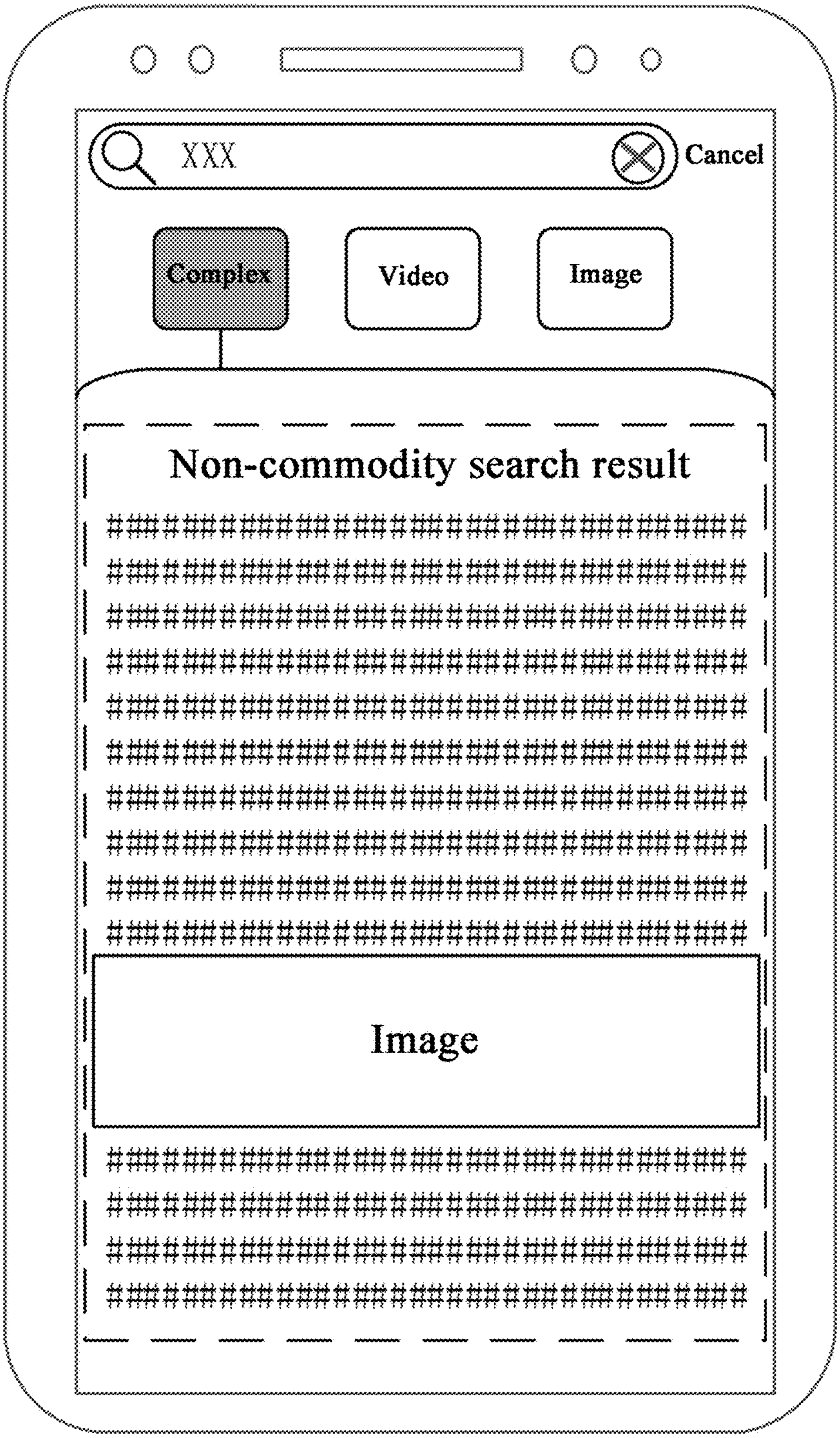
FIG. 4*b* illustrates a schematic diagram of inserting the commodity card matching the search information in the search request into display content of a non-commodity search result in the search result page provided in embodiments of the present disclosure.

The commodity card matching the search information in the search request may be inserted between a plurality of different non-commodity search results in the search result page for display. Referring to FIG. 4*a*, it is a schematic diagram of inserting the commodity card matching the search information in the search request between a plurality of different non-commodity search results of the search result page. Alternatively or additionally, the commodity card matching the search information in the search request may also be inserted into display content of the non-commodity search result in the search result page for display. Referring to FIG. 4*b*, it is a schematic diagram of inserting the commodity card matching the search information in the search request into the display content of the non-commodity search result in the search result page.

Here, the commodity card matching the search information in the search request may be specifically determined in the following manner: a plurality of commodities matching the search information may be determined based on the search information in the search request. The popularity of each commodity is determined, and a commodity card corresponding to the commodity with the highest popularity is used as the commodity card matching the search information in the search request. Here, the commodities are in one-to-one correspondence with the commodity cards, and the commodity card matching each commodity may be preset and stored in the system.

Exemplarily, if the search information is a certain movie, and the content with the highest popularity for the movie comments is dress-up information of a certain actor, then the plurality of commodities matching the search content may comprise clothing, headwear and the like of the actor. If the comment with the highest popularity is the clothing, such as Han Chinese clothing of XX brand, then the commodity card corresponding to the Han Chinese clothing of XX brand with the highest popularity may be inserted into the search results for the movie.

S103: displaying, in a search result page, a search result comprising a commodity card according to the commodity card display form, wherein the commodity card is used for carrying information content of a corresponding commodity.

Specifically, the search result comprising the commodity card may be displayed in the search result page according to the determined commodity card display form.

The commodity cards may comprise a commodity card of an image class, a video class, an image-text class, or the like.

Here, the search result may be determined based on the search request. For example, if the search information of the search request is "lily", the multimedia content matching the search information may comprise, for example, a commodity purchase about lily, popular science about lily, an introduction of lily species, an introduction of planting technologies about lily, a video about lily, a website, and the like. At this time, it is determined that the search intention type is the intermediate class search intention, and the determined corresponding commodity card display form is the superposition display. Then it is determined that the commodity card display form is the superposition display, and different commodity cards related to lily are superimposed together in a certain region of the search result page for display.

In addition, in the case where the commodity card display form is the superposition display, the search result comprising the commodity cards is displayed in the search result page. In a specific embodiment, the commodity cards may be displayed in the secondary display region of the search result page according to the superposition display mode. In response to a trigger operation acting on the commodity cards that are displayed in the superposition mode, the lower-layer commodity cards are sequentially placed on the topmost layer for display.

Here, regarding the specific embodiment of displaying the commodity cards in the superposition mode, reference may be made to the above detailed description of the commodity cards that are displayed in the superposition mode. Regarding the schematic diagram of displaying the commodity cards in the superposition mode, reference may be made to FIG. 3, therefore repeated parts are not described herein again.

For the plurality of commodity cards displayed in the secondary display region in the superposition mode, in response to a trigger operation acting on the commodity cards that are displayed in the superposition mode, for example, a sliding operation, a next-layer commodity card for the currently displayed commodity card is acquired based on the sorting sequence of the commodity cards that are displayed in the superposition mode, and the acquired next-layer commodity card is placed on the topmost layer for display.

With the above S101 to S103, the commodity cards can be displayed in a target manner according to the search intention type of the user. For example, for a search request with a relatively high demand for a result of a commodity class, the corresponding commodity card can be displayed in a highlighted mode. For a search request with a relatively low demand for a result of a commodity class, the commodity card can be displayed in a non-highlighted mode. Therefore, commodity information in the search result can be displayed in a mode such that the user requirements can be met, and then the user can browse the information conveniently, quickly and effectively.

It will be understood by those skilled in the art that, in the above method of specific embodiments, the writing sequence of each step does not mean a strict execution sequence to constitute any limitation on the implementation process, and the specific execution sequence of each step should be determined by its function and possible internal logic.

Based on the same inventive concept, an embodiment of the present disclosure further provides an apparatus corresponding to the method. Since the principles of the apparatus for solving problems in the embodiment of the present disclosure are similar to those of the search result display method in the embodiment of the present disclosure, the implementation of the apparatus may refer to the implementation of the method, and thus details are not described again.

Figure 5:
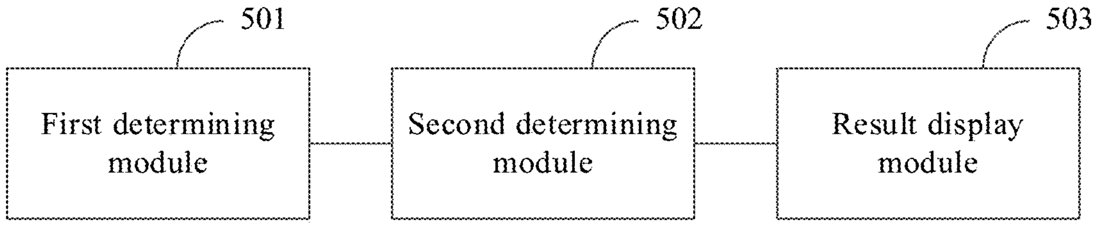
FIG. 5 illustrates a schematic diagram of an apparatus for displaying a search result provided in embodiments of the present disclosure.

As shown in FIG. 5, it is a schematic diagram of an apparatus for displaying a search result provided in an embodiment of the present disclosure, and the apparatus comprises a first determining module 501, a second determining module 502, and a result display module 503, wherein,

- the first determining module 501 is configured to: in response to a search request of a user, determine a search intention type corresponding to the search request, wherein the search intention type is used for indicating a demand degree of the user for a result of a commodity class;
- the second determining module 502 is configured to determine a commodity card display form according to the determined search intention type; and
- the result display module 503 is configured to: display, in a search result page, a search result comprising a commodity card according to the commodity card display form, wherein the commodity card is used for carrying information content of a corresponding commodity.

In an optional embodiment, the determined search intention type is a commodity class search intention; a demand degree of the commodity class search intention for the result of the commodity class is higher than a demand degree of a search intention of another class for the result of the commodity class; and the result display module 503 is specifically configured to: for the commodity card display form corresponding to the commodity class search intention, display respective commodity cards in a first display region of the search result page according to a preset arrangement mode, wherein the commodity cards comprise at least one of a first commodity card carrying video content as information content, a second commodity card carrying live streaming content as information content, or a third commodity card carrying image content as information content.

In an optional embodiment, the result display module 503 is specifically configured to display a plurality of initial commodity cards in the first display region of the search result page according to a transverse arrangement mode; and in response to a left-right sliding operation acting on the displayed commodity cards, switch to display different commodity cards in the first display region.

In an optional embodiment, the result display module 503 is specifically configured to display a plurality of initial commodity cards in the first display region of the search result page according to a multi-column arrangement mode;

in response to a sliding operation acting on the displayed commodity cards or in response to a trigger operation for prompt information of viewing more commodities, expand the display position range of the first display region; and display the plurality of initial commodity cards and another commodity card in the first display region with the expanded display position range.

In an optional embodiment, the determined search intention type is an intermediate class search intention, a demand degree of the intermediate class search intention for the result of the commodity class is lower than the demand degree of the commodity class search intention for the result of the commodity class, and is higher than a demand degree of a non-commodity class search intention for the result of the commodity class; and the result display module 503 is specifically configured to: for the commodity card display form corresponding to the intermediate class search intention, display the commodity cards in a secondary display region of the search result page according to a superposition display mode, wherein the commodity cards are superposed in the superposition display mode, and each commodity card other than the commodity card located on the topmost layer displays a portion of card information.

In an optional embodiment, the result display module 503 is specifically configured to display the commodity cards in the secondary display region of the search result page according to the superposition display mode; and in response to a trigger operation acting on the commodity cards that are displayed in the superposition mode, sequentially place a lower-layer commodity card on the topmost layer for display.

In an optional embodiment, the determined search intention type is the non-commodity class search intention; and a demand degree of the non-commodity class search intention for the result of the commodity class is lower than a demand degree of a search intention of another class for the result of the commodity class; and the result display module 503 is specifically configured to: for the commodity card display form corresponding to the non-commodity class search intention, insert a commodity card matching search information in the search request into a non-commodity search result of the search result page for display.

In an optional embodiment, the first determining module 501 is specifically configured to calculate relevance between a search word in the search request and each keyword in a vocabulary library corresponding to the commodity class search intention; and determine the search intention type corresponding to the search request according to the determined relevance.

In an optional embodiment, the first determining module 501 is specifically configured to: determine multimedia content matching the search request according to the search request;

calculate relevance between the multimedia content and each keyword in the vocabulary library corresponding to the commodity class search intention; and determine the search intention type corresponding to the search request according to the determined relevance.

With regard to the description of the processing flow of each module in the apparatus and the interaction process between the modules, reference may be made to the related description in the foregoing method embodiments, and thus details are not described in detail herein.

Figure 6:
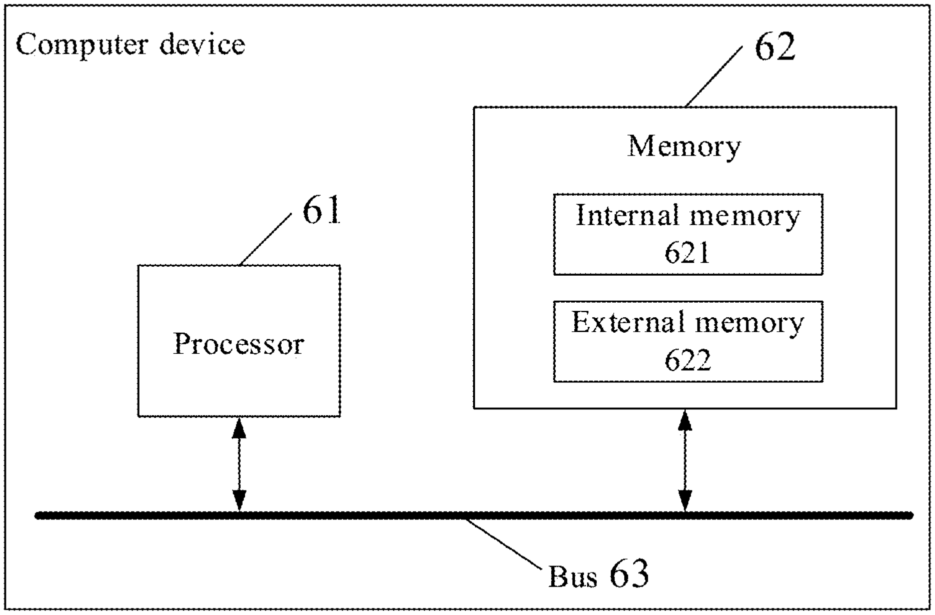
FIG. 6 illustrates a schematic diagram of a computer device provided in embodiments of the present disclosure.

Based on the same technical concept, an embodiment of the present disclosure further provides a computer device. Referring to FIG. 6, it is a schematic structural diagram of a computer device provided in embodiments of the present disclosure, wherein the computer device comprises:

a processor 61, a memory 62 and a bus 63. The memory 62 stores a machine-readable instruction executable by the processor 61, the processor 61 is configured to execute the machine-readable instruction stored in the memory 62, and when the machine-readable instruction is executed by the processor 61, the processor 61 executes the following steps: S101: in response to a search request of a user, determining a search intention type corresponding to the search request, wherein the search intention type is used for indicating a demand degree of the user for a result of a commodity class; S102: determining a commodity card display form according to the determined search intention type; and S103: displaying, in a search result page, a search result comprising a commodity card according to the commodity card display form, wherein the commodity card is used for carrying information content of a corresponding commodity.

The memory 62 comprises an internal memory 621 and an external memory 622; the internal memory 621 herein is also referred to as an internal storage, which is used for temporarily storing operation data in the processor 61 and data exchanged with the external memory 622 such as a hard disk. The processor 61 exchanges data with the external memory 622 through the internal memory 621, and when the computer device is running, the processor 61 communicates with the memory 62 through the bus 63. As such, the processor 61 executes the execution instruction mentioned in the embodiments of the above method.

An embodiment of the present disclosure further provides a computer-readable storage medium, wherein a computer program is stored on the computer-readable storage medium, and when operated by a processor, the computer program executes the steps of the search result display method in the above embodiments of the method. The storage medium may be a volatile or non-volatile computer-readable storage medium.

An embodiment of the present disclosure further provides a computer program product, wherein the computer program product carries a program code, an instruction comprised in the program code may be used for executing the steps of the search result display method in the above embodiments of the method, specific reference may be made to the above method embodiments, and thus details are not described herein again.

An embodiment of the present disclosure further provides a computer program, wherein when executed by a processor, the computer program implements the steps of the search result display method in the above embodiments of the method.

The computer program product may be specifically implemented by hardware, software, or a combination thereof. In an optional embodiment, the computer program product is specifically embodied as a computer storage medium. In another optional embodiment, the computer program product is specifically embodied as a software product, such as a software development kit (SDK), etc.

Those skilled in the art to which the present disclosure belongs can clearly understand that, for the convenience and brevity of description, with regard to the specific working process of the system and apparatus described above, reference may be made to the corresponding process in the foregoing method embodiments, and thus details are not described herein again. In the several embodiments provided in the present disclosure, it should be understood that, the disclosed apparatus and method may be implemented in other manners. The embodiments of the apparatus described above are merely exemplary, for example, the division of the units is only a logic function division, there may be other division manners in practical implementations. As another example, a plurality of units or components may be combined, or some features may be omitted or not implemented. From another point of view, the displayed or discussed mutual coupling or direct coupling or communication connection may be indirect coupling or communication connection of apparatuses or units through some communication interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to implement the purposes of the solutions in the present embodiment according to actual demands.

In addition, the functional units in various embodiments of the present disclosure may be integrated in a processing unit, or the units individually exist physically, or two or more units are integrated in one unit.

If a function is implemented in the form of a software functional unit and is sold or used as an independent product, it may be stored in a non-volatile computer-readable storage medium executable by a processor. Based on this understanding, the technical solutions of the present disclosure substantially, or the part contributing to the prior art, or some technical solutions may be implemented in the form of a software product, the computer software product is stored in a storage medium, and comprises several instructions for enabling a computer device (which may be a personnel computer, a server, or a network device or the like) to execute all or part of the steps of the method in various embodiments of the present disclosure. The foregoing storage medium comprises a variety of media capable of storing program codes, such as a USB disk, a mobile hard disk, a read-only memory (ROM), a random access memory (RAM), a magnetic disk, or an optical disk.

Finally, it should be noted that, the embodiments described above are merely specific implementations of the present disclosure, and are used to illustrate the technical solutions of the present disclosure instead of limiting the same. The protection scope of the present disclosure is not limited thereto, although the present disclosure has been described in detail with reference to the foregoing embodiments, those ordinary skilled in the art should understand that, any skilled familiar with this art may modify or easily conceive of changing the technical solutions recited in the foregoing embodiments, or equivalently replace some of the technical features therein; and these modifications, changes or substitutions do not make the nature of the corresponding technical solutions depart from the spirit and scope of the technical solutions of the embodiments of the present disclosure, and shall fall within the protection scope of the present disclosure. Therefore, the protection scope of the present disclosure shall be subject to the protection scope of the claims.

What is claimed is:

1. A method of displaying a search result, comprising:

in response to a search request of a user, determining a search intention type corresponding to the search request, wherein the search intention type is used for indicating a demand degree of the user for a result of a commodity class; the search intention type comprises a commodity class search intention, an intermediate class search intention, or a non-commodity class search intention; the demand degree of the commodity class search intention for the result of the commodity class is higher than a demand degree of a search intention of another class for the result of the commodity class; and the demand degree of the intermediate class search intention for the result of the commodity class is lower than the demand degree of the commodity class search intention for the result of the commodity class, and is higher than the demand degree of a non-commodity class search intention for the result of the commodity class;

determining a commodity card display form according to the search intention type; and displaying, in a search result page, a search result comprising a commodity card according to the commodity card display form, wherein the commodity card is used for carrying information content of a corresponding commodity, wherein in response to the search intention type being the intermediate class search intention, displaying the search result comprising the commodity card according to the commodity card display form comprises:

displaying respective commodity cards in a secondary display region of the search result page according to a superposition display mode, wherein the commodity cards are superposed in the superposition display mode, and each commodity card other than a commodity card located on the topmost layer displays a portion of card information.

2. The method according to claim 1, wherein in response to the search intention type being the commodity class search intention, displaying the search result comprising the commodity card according to the commodity card display form comprises:

displaying respective commodity cards in a first display region of the search result page according to a preset arrangement mode, wherein the commodity cards comprise at least one of a first commodity card carrying video content as information content, a second commodity card carrying live streaming content as information content, or a third commodity card carrying image content as information content.

3. The method according to claim 2, wherein displaying respective commodity cards in the first display region of the search result page according to the preset arrangement mode comprises:

displaying a plurality of initial commodity cards in the first display region of the search result page according to a transverse arrangement mode; and in response to a left-right sliding operation acting on the displayed commodity cards, switching to display different commodity cards in the first display region.

4. The method according to claim 2, wherein displaying respective commodity cards in the first display region of the search result page according to the preset arrangement mode comprises:

displaying a plurality of initial commodity cards in the first display region of the search result page according to a multi-column arrangement mode;

in response to a sliding operation acting on the displayed commodity cards or in response to a trigger operation for prompt information of viewing more commodities, expanding a display position range of the first display region; and displaying the plurality of initial commodity cards and another commodity card in the first display region with the expanded display position range.

5. The method according to claim 1, wherein displaying, in the search result page, the search result comprising the commodity card according to the commodity card display form, comprises:

displaying the commodity cards in the secondary display region of the search result page according to the superposition display mode; and in response to a trigger operation acting on the commodity cards that are displayed in the superposition mode, sequentially placing a lower-layer commodity card on the topmost layer for display.

6. The method according to claim 1, wherein in response to the search intention type being the non-commodity class search intention, displaying the search result comprising the commodity card according to the commodity card display form comprises:

inserting a commodity card matching search information in the search request into a non-commodity search result in the search result page for display.

7. A computer device, comprising: a processor and a memory, wherein the memory stores machine-readable instructions executable by the processor, the processor is configured to execute the machine-readable instructions stored in the memory, and when the machine-readable instruction is executed by the processor, the processor is caused to:

in response to a search request of a user, determine a search intention type corresponding to the search request, wherein the search intention type is used for indicating a demand degree of the user for a result of a commodity class; the search intention type comprises a commodity class search intention, an intermediate class search intention, or a non-commodity class search intention; the demand degree of the commodity class search intention for the result of the commodity class is higher than a demand degree of a search intention of another class for the result of the commodity class; and the demand degree of the intermediate class search intention for the result of the commodity class is lower than the demand degree of the commodity class search intention for the result of the commodity class, and is higher than the demand degree of a non-commodity class search intention for the result of the commodity class;

determine a commodity card display form according to the search intention type; and display, in a search result page, a search result comprising a commodity card according to the commodity card display form, wherein the commodity card is used for carrying information content of a corresponding commodity, wherein in response to the search intention type being the intermediate class search intention, displaying the search result comprising the commodity card according to the commodity card display form comprises:

displaying respective commodity cards in a secondary display region of the search result page according to a superposition display mode, wherein the commodity cards are superposed in the superposition display mode, and each commodity card other than a commodity card located on the topmost layer displays a portion of card information.

8. A non-transitory computer-readable storage medium, wherein a computer program is stored on the computer-readable storage medium, and when the computer program is operated by a computer device, the computer device is caused to:

in response to a search request of a user, determine a search intention type corresponding to the search request, wherein the search intention type is used for indicating a demand degree of the user for a result of a commodity class; the search intention type comprises a commodity class search intention, an intermediate class search intention, or a non-commodity class search intention; the demand degree of the commodity class search intention for the result of the commodity class is higher than a demand degree of a search intention of another class for the result of the commodity class; and the demand degree of the intermediate class search intention for the result of the commodity class is lower than the demand degree of the commodity class search intention for the result of the commodity class, and is higher than the demand degree of a non-commodity class search intention for the result of the commodity class;

determine a commodity card display form according to the search intention type; and display, in a search result page, a search result comprising a commodity card according to the commodity card display form, wherein the commodity card is used for carrying information content of a corresponding commodity, wherein in response to the search intention type being the intermediate class search intention, displaying the search result comprising the commodity card according to the commodity card display form comprises:

displaying respective commodity cards in a secondary display region of the search result page according to a superposition display mode, wherein the commodity cards are superposed in the superposition display mode, and each commodity card other than a commodity card located on the topmost layer displays a portion of card information.

9. The computer device according to claim 7, wherein in response to the search intention type being the commodity class search intention, displaying the search result comprising the commodity card according to the commodity card display form comprises:

displaying respective commodity cards in a first display region of the search result page according to a preset arrangement mode, wherein the commodity cards comprise at least one of a first commodity card carrying video content as information content, a second commodity card carrying live streaming content as information content, or a third commodity card carrying image content as information content.

10. The computer device according to claim 9, wherein displaying respective commodity cards in the first display region of the search result page according to the preset arrangement mode comprises:

displaying a plurality of initial commodity cards in the first display region of the search result page according to a transverse arrangement mode; and in response to a left-right sliding operation acting on the displayed commodity cards, switching to display different commodity cards in the first display region.

11. The computer device according to claim 9, wherein displaying respective commodity cards in the first display region of the search result page according to the preset arrangement mode comprises:

displaying a plurality of initial commodity cards in the first display region of the search result page according to a multi-column arrangement mode;

in response to a sliding operation acting on the displayed commodity cards or in response to a trigger operation for prompt information of viewing more commodities, expanding a display position range of the first display region; and displaying the plurality of initial commodity cards and another commodity card in the first display region with the expanded display position range.

12. The computer device according to claim 7, wherein displaying, in the search result page, the search result comprising the commodity card according to the commodity card display form, comprises:

displaying the commodity cards in the secondary display region of the search result page according to the superposition display mode; and in response to a trigger operation acting on the commodity cards that are displayed in the superposition mode, sequentially placing a lower-layer commodity card on the topmost layer for display.

13. The computer device according to claim 7, wherein in response to the search intention type being the non-commodity class search intention, displaying the search result comprising the commodity card according to the commodity card display form comprises:

inserting a commodity card matching search information in the search request into a non-commodity search result in the search result page for display.

14. The non-transitory computer-readable storage medium according to claim 8, wherein in response to the search intention type being the commodity class search intention, displaying the search result comprising the commodity card according to the commodity card display form comprises:

displaying respective commodity cards in a first display region of the search result page according to a preset arrangement mode, wherein the commodity cards comprise at least one of a first commodity card carrying video content as information content, a second commodity card carrying live streaming content as information content, or a third commodity card carrying image content as information content.

15. The non-transitory computer-readable storage medium according to claim 14, wherein displaying respective commodity cards in the first display region of the search result page according to the preset arrangement mode comprises:

displaying a plurality of initial commodity cards in the first display region of the search result page according to a transverse arrangement mode; and in response to a left-right sliding operation acting on the displayed commodity cards, switching to display different commodity cards in the first display region.

16. The method according to claim 1, wherein determining the search intention type corresponding to the search request comprises:

calculating relevance between a search word in the search request and each keyword in a vocabulary library corresponding to the commodity class search intention; and determining the search intention type corresponding to the search request according to the determined relevance.

17. The method according to claim 1, wherein determining the search intention type corresponding to the search request comprises:

determining multimedia content matching the search request according to the search request;

calculating relevance between the multimedia content and each keyword in a vocabulary library corresponding to the commodity class search intention; and determining the search intention type corresponding to the search request according to the determined relevance.

18. The computer device according to claim 7, wherein the computer device being caused to determine the search intention type corresponding to the search request comprises being caused to:

calculate relevance between a search word in the search request and each keyword in a vocabulary library corresponding to the commodity class search intention; and determine the search intention type corresponding to the search request according to the determined relevance.

* * * * *